United States Patent [19]
Kuwana et al.

[11] Patent Number: 5,375,918
[45] Date of Patent: Dec. 27, 1994

[54] ANTI-SKID CONTROL SYSTEM

[75] Inventors: Kazutaka Kuwana; Kuniaki Okamoto; Tsuyoshi Yoshida; Hiroyuki Ichikawa; Masaru Kamikado; Nobuyasu Nakanishi, all of Aichi Pref.; Tatsuo Sugitani, Shizuoka Pref.; Kazunori Sakai, Aichi Pref., all of Japan

[73] Assignee: Aisin Seiki Kabushiki Kaisha, Kariya, Japan

[21] Appl. No.: 128,757

[22] Filed: Sep. 30, 1993

Related U.S. Application Data

[63] Continuation of Ser. No. 563,139, Aug. 6, 1990, abandoned.

[30] Foreign Application Priority Data

Aug. 4, 1989 [JP] Japan .................. 1-203490

[51] Int. Cl.$^5$ .............................. B60T 8/64
[52] U.S. Cl. .............................. 303/110; 303/108
[58] Field of Search ............... 303/105, 106, 107, 108, 303/109, 110, 117, 93; 364/426.02

[56] References Cited

U.S. PATENT DOCUMENTS

| | | | |
|---|---|---|---|
| 4,741,580 | 5/1988 | Matsubara et al. | 303/105 |
| 4,881,784 | 11/1989 | Leppek | 303/110 X |
| 4,925,253 | 5/1990 | Swiden | 303/110 |

FOREIGN PATENT DOCUMENTS 62-155163  7/1987  Japan .

Primary Examiner—Matthew C. Graham
Attorney, Agent, or Firm—Sughrue, Mion, Zinn, Macpeak & Seas

[57] ABSTRACT

The anti-skid control system is capable of performing highly reliable anti-skid control through its accurate estimation of the vehicle speed and proper compensatory control even when sharp braking occurs or in the brake fluid pressure control on road surfaces with a low coefficient of friction likely to cause considerable fluctuations in wheel acceleration. The anti-skid control system is provided with a fluid pressure generating device, a fluid pressure controlling device, a wheel velocity detecting device, a standard speed setting device, a fluid pressure controlling mode setting device which sets either the pressure decrease mode or the pressure hold mode when the wheel velocity declines to a level lower than the standard speed and sets the pressure increase mode when the wheel velocity is equal to or higher than the standard speed. A maximum inflection point detecting device detects the maximum inflection point indicating the maximum value for the shift of the wheel velocity mentioned above from an increase to a decrease when the wheel velocity is not any lower than the standard speed. A fluid pressure controlling mode correcting device switches from the pressure increase mode mentioned above to either the pressure hold mode or the pressure decrease mode when the wheel velocity becomes equal to or higher than the standard speed and also becomes equal to or higher than the wheel velocity at the maximum inflection point.

1 Claim, 8 Drawing Sheets

ANTI-SKID CONTROL SYSTEM

This is a continuation of application No. 07/563,139 filed Aug. 6, 1990 now abandoned.

FIELD OF THE INVENTION

The present invention relates to an anti-skid control system which prevents the wheels from locking through control performed over the braking force exerted on the wheels at the time when the brake is applied to the motor vehicle.

BACKGROUND OF THE INVENTION

[Prior Art]

it has been widely known that the directional stability of a motor vehicle is lost in some cases, depending on the conditions of the road surface, if the wheels of the motor vehicle are locked when the brake is applied sharply. Therefore, it is in practice to control the braking force in such a manner as to eventually keep the slip factor of the wheels at approximately 20%, that is, so as to obtain the maximum coefficient of friction, by controlling the brake fluid pressure in accordance with the changes in the wheel velocity and the wheel acceleration, in consideration of the fact that the wheel velocity declines abruptly immediately before the coefficient of friction $\mu$ attains the maximum value in relation to the wheels when the pressure of the brake fluid working on the wheel cylinder is increased at the time of braking. Specifically, motor vehicles are equipped with an anti-skid control system which controls the braking force by reducing, increasing, or maintaining the pressure of the brake fluid working on the wheel cylinders, so that the wheels are not locked at the time of sharp braking.

With respect to such an anti-skid control system, the Japanese Kokai No. 155163-1987, for example, proposes an anti-skid control process which consists in finding a simulated vehicle speed on the basis of the wheel velocity, working out by arithmetic operations a standard speed which follows up this simulated vehicle speed at a speed lower by a certain fixed speed difference, and increasing the brake fluid pressure only in case this high peak speed based on the simulated vehicle speed is either equal to or higher than the standard speed but again reducing the brake fluid pressure in case the high peak speed is lower than the standard speed, so that the process serves the purpose of preventing a wheel lock at an early point in time in consequence of the failure in the recovery of the vehicle speed in case the vehicle speed is low.

[Problems to be Overcome by the Invention]

The prior art process cited above is so formed as to apply increased brake fluid Pressure as from the point in time when the high peak speed has exceeded the standard speed worked out by arithmetic operations from the simulated vehicle speed. However, in case any brake operation is applied while a motor vehicle is running on a rough road surface or the like, fluctuations occur in the wheel speed, so that an increase of the brake fluid pressure without any further adjustments would be liable to cause a wheel lock at an early point in time even if the high peak speed is equal to or in excess of the standard speed. This tendency is conspicuous on rough road surfaces with a low coefficient of friction $\mu$, such as a road covered with trodden snow.

FIG. 9 illustrates art example of the basic control with the anti-skid control system embodying the present invention. The items from the uppermost item downward show the changes in the pressure of the brake fluid in the wheel cylinders, the changes in the vehicle speed and the wheel velocity, the changes in the wheel acceleration, and the states of the fluid pressure controlling modes in the stated order. Now, the operations of the system as shown in this Figure are described in outline along with the passage of time. The braking operation is performed at the point A, causing an increase in the pressure of the brake fluid in the wheel cylinders, and braking force is thereby exerted onto the wheels. With this, the wheel velocity Vw declines, but, depending on the specific condition of the road surface, the wheel velocity may decline at a decline ratio larger than the decline ratio of the estimated vehicle speed set at the time when the brake operation is started, with the result that the wheels show a tendency to lock. In this regard, the actual vehicle speed V is introduced here in order to facilitate an understanding of the description even though it is not actually measured in the process of control with this system. Moreover, in order to detect the tendency of the wheels to lock, the control process uses a standard speed $Vs_n$, which is set as expressed in the following equation (1) with a prescribed slip factor:

$$V_{sN} = A \cdot V_{sO} - B \qquad (1)$$

Where in, A and B are constants, for which the following values, for example, are selected:

$$A = 0.97 \text{ and } B = 2 \text{ km/h}$$

Furthermore, the wheel acceleration Gw is obtained by differentiating the wheel Velocity Vw, and, as shown in FIG. 10, the brake fluid pressure control is set up in such a manner that a pressure reducing operating is performed on the pressure of the brake fluid in the wheel cylinders as in the section between the point B and the point C in FIG. 9, when the obtained value satisfies ! the relations, $Vw < Vs_N$ and $Gw < G_1$ (wherein, $G_1$ expresses the prescribed acceleration), but otherwise maintaining the brake fluid pressure, as is the case with the section between the point c and the point D in FIG. 9. Then, after the maximum inflection point of the wheel velocity Vw is detected on the basis of the wheel acceleration Gw, step-by-step increases are made of the brake fluid pressure as from the point D in FIG. 9. That is to say, the system performs step-by-step increases of the pressure.

Even if the technique disclosed in the Japanese Kokai No. 155163-1987 cited above were applied to the above-mentioned example of the basic control, the cited process would increase the pressure of the brake fluid in case the high peak, i.e. the maximum inflection point, occurs in a state wherein the wheel velocity Vw is not any lower than the standard speed $Vs_N$. Accordingly, the speed would decline without the recovery of the wheel velocity Vw, and thus the cited process does not eliminate the liability of the wheels to a lock at an early point in time. In other words, the state of control in this situation is such that the speed declines before the wheel velocity Vw recovers to a point close to the actual vehicle Speed V at the point D, as shown in FIG. 11, so that also the estimated vehicle speed $V_{sO}$ deviates more and more from the actual vehicle speed V and the wheels suddenly approaches their locking.

SUMMARY OF THE INVENTION

[Objects of the Invention]

Therefore, the present invention takes it up as its object to offer an anti-skid control system capable of preventing the wheels from their early-stage locking due to the fluctuations or the like in the wheel speed and more particularly to offer such a system capable of preventing the wheels from their early-stage locking even in case the maximum inflection point occurs at a wheel velocity not any lower than the standard speed.

[Means of Accomplishing the Objects]

In order to accomplish the objects described above, the anti-skid control system according to the present invention, as illustrated in the Outline of its construction given in FIG. 1, is provided with wheel cylinder 53 and so forth, which furnishes braking force to the individual wheels, such as the rear wheels, of a motor vehicle, a fluid pressure generating device M1, which feeds brake fluid pressure to the wheel cylinders 53, etc., a fluid pressure controlling device M2, which is set in the fluid pressure channel connected for fluid inter-transmission with the fluid pressure generating device M1 and the wheel cylinders 53, etc., a wheel velocity detecting means M3, which detects the rotating speed of the rear wheels, etc. and outputs signals in accordance with the wheel velocity, a standard speed setting means M4, which works out the standard speed by arithmetic operations on the basis of the wheel velocity which the wheel velocity detecting means has detected, a fluid pressure controlling mode setting means M5, which, being a fluid pressure controlling mode setting means which drives the fluid pressure controlling device M2 by setting either one of the fluid pressure controlling modes, namely, the pressure decrease mode for increasing the brake fluid pressure, the pressure:decrease mode for reducing the brake fluid pressure, and the pressure hold mode for maintaining the pressure of the brake fluid, sets either one of the pressure decrease mode and the pressure hold mode in case the wheel velocity has fallen below the standard speed but sets the pressure increase mode in case the wheel speed has become equal to or higher than the standard speed, a maximum inflection point detecting means M6, which detects the maximum value for the transit ion of the wheel velocity from its increase to its decrease, when at least the wheel velocity is not any lower than the standard speed, and a fluid pressure controlling mode correcting means M7, which changes the pressure increase mode over to either one of the pressure hold mode and the pressure decrease mode, in case the wheel velocity, even if not any lower than the standard speed, becomes equal to or higher than the wheel velocity at the maximum inflection point. [Effect]

The anti-skid control system formed in the construction described above works in such a manner that, when the fluid pressure generating device M1 feeds the brake fluid pressure to the wheel cylinders 53 and so forth by way of the fluid pressure controlling device M2, braking force is thereby applied to the individual wheels, such as RR. In the meantime, the wheel velocity detecting means M3 detects the rotating speed, namely the wheel velocity, of the wheel RR, etc.

The wheel velocity signals s output from the wheel velocity detecting means M3 are fed to the standard speed setting means M4, which works out the standard speed through arithmetic operations. The standard speed and wheel velocity are compared for their magnitude by the fluid pressure controlling mode setting means M5, and the fluid pressure controlling mode is set in accordance with the result of such a comparison. That is to say, either the pressure decrease mode or the pressure hold mode is set in case the wheel velocity is less than the standard speed, whereas the pressure increase mode is set in case the wheel velocity is equal to or higher than the standard speed.

Furthermore, the standard speed signal mentioned above is fed to the maximum inflection point detecting means, which detects the maximum inflection point that indicates the maximum value at which the wheel velocity shifts from its increase to its decrease in case at least the wheel velocity is equal to or in excess of the standard speed. Then, in case the wheel velocity is not any lower than the standard speed and is equal to or higher than the wheel velocity at the maximum inflection point, the fluid pressure controlling mode is switched from the pressure increase mode to either the pressure hold mode or the pressure decrease mode by the fluid pressure controlling mode correcting means M7, and the wheels are thereby prevented from proceeding to the state of their locking.

BRIEF DESCRIPTION OF THE DRAWINGS

The manner by which the above objects, features and advantages of the present invention are attained will be fully evident from the following detailed description when it is considered in light of the attached drawings, wherein.

Figure 1:
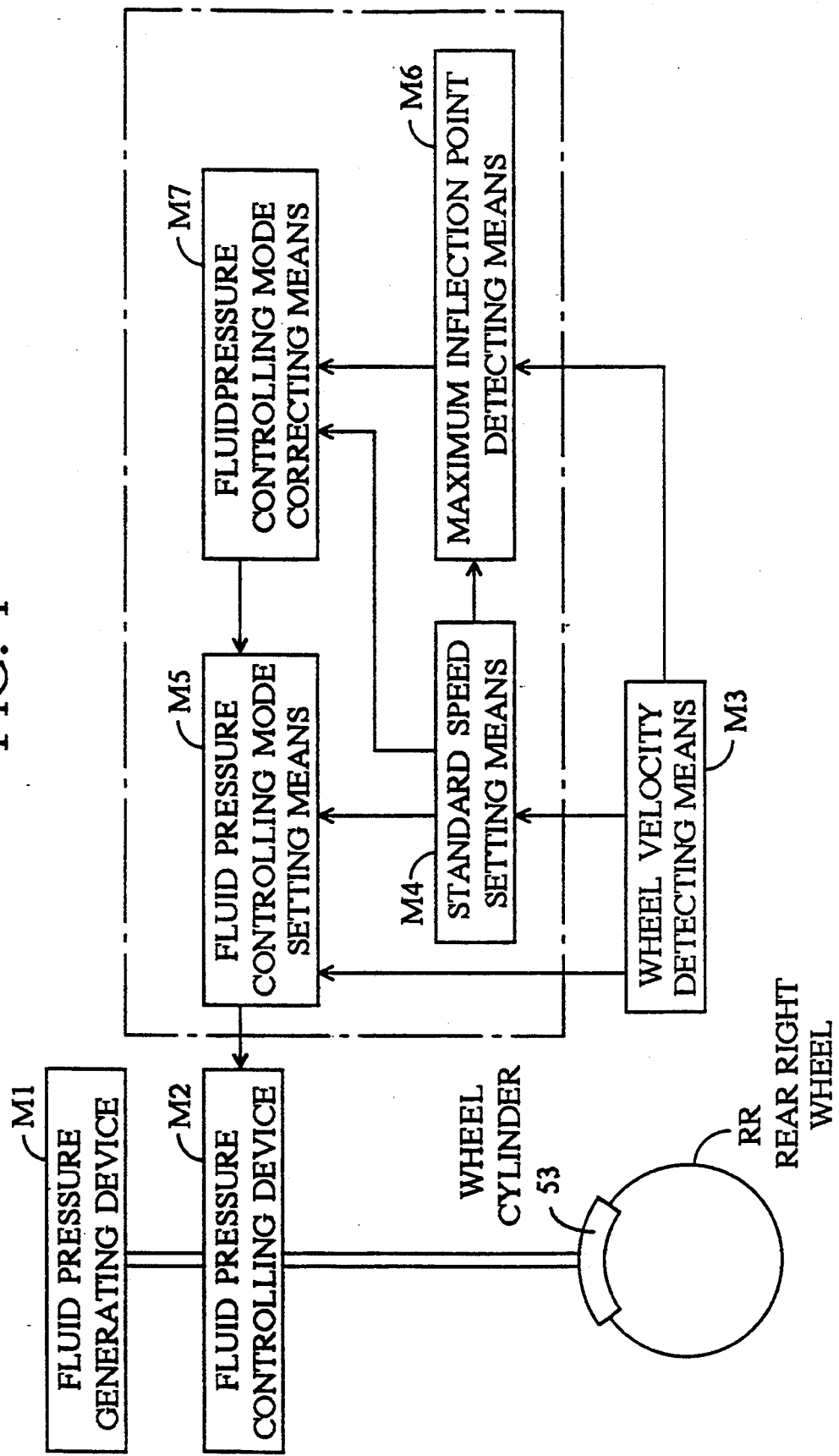
FIG. 1 is a block diagram illustrating the outline of the anti-skid control system according to the present invention.

In the Figures mentioned hereinabove, the following reference numbers represent, the following items:

2 . . . Fluid pressure generating device
2a . . . Master cylinder 2b . . . Booster
3 . . . Brake pedal
10 . . . Electronic control device
11 . . . Microprocessor 20 ... wheel velocity sensor (wheel velocity detecting means)
21 ... Acceleration sensor
22 ... Brake switch
30 ... Actuator (Fluid pressure controlling device)
31 and 32 ... Solenoids
40 ... Pump 41 ... Reserver
51 through 54 ... Wheel cylinders
FR, FL, RR, and RL ... Wheels

DETAILED DESCRIPTION OF THE INVENTION

Reference will now be made in detail to the specific construction of the preferred embodiments of the anti-skid control system according to the present invention as illustrated in the accompanying drawings, in which like reference numbers designate like or corresponding parts throughout the several drawings.

In the description to follow, some embodiments of the present invention will be used as examples. It should be understood, however, that the present invention is not limited to these examples of its embodiment, but may be applied effectively to other forms of its embodiment to such an extent as will not, deviate from the technical scope defined for the present invention.

Figure 2:
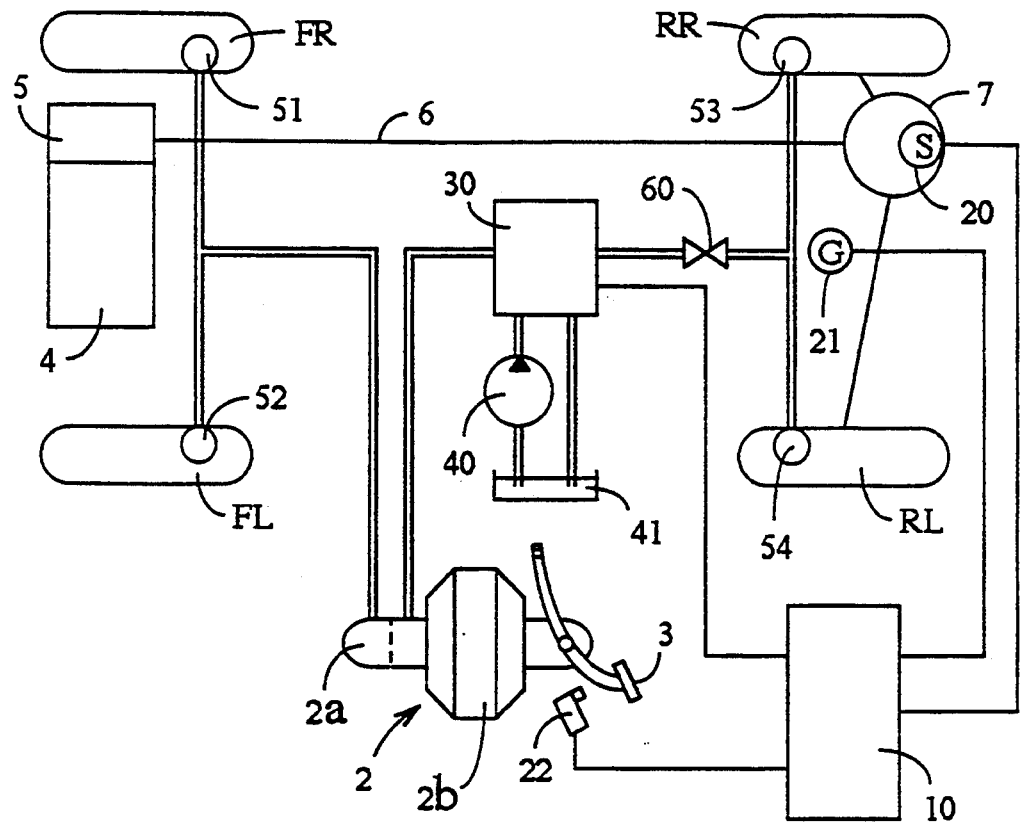
FIG. 2 is a chart illustrating the overall configuration of one preferred embodiment of the anti-skid control system according to the present invention.

Now, FIG. 2 illustrates a motor vehicle equipped with the anti-skid control system in one embodiment of the present invention, and this system has a fluid pressure generating device 2, which is comprised of a master cylinder 2a and a booster 2b, and is driven with a brake pedal 3.

The master cylinder 2a, which is generally known as the tandem type master cylinder, is connected directly to the wheel cylinders 51 and 52 for the wheels FR and FL and connected also to the wheel cylinders 53 and 54 for the wheels RR and RL by way of the actuator (fluid pressure controlling device) 30 and the proportioning valve 60. Here, the term, "wheel FR", stands for the wheel positioned on the front right side of the vehicle as viewed from the driver's seat. Likewise, the term, "the wheel FL" represents the wheel on the front left side of the vehicle, the term, "the wheel RR", represents the wheel on the reap right side of the vehicle, and the term, "the wheel RL", represents the wheel on the rear left side of the vehicle. The piping system employed for this system is a piping system divided into two independent systems respectively serving the front wheels and the rear wheels. The internal combustion engine 4 mounted on the vehicle used in this example of preferred embodiment has a generally known transmission 5 connected to it. The transmission 5 connected to a differential gear 7 via a propeller shaft 6. To this differential gear 7 are connected the wheels RR and RL, to which the driving force of the internal combustion engine 4 is transmitted.

Therefore, when stepping force is applied onto the brake pedal 3, the booster 2b is driven in accordance with the stepping force, and the master cylinder 2a is driven under boosted pressure exerted by the booster 2b. By this, the brake fluid pressure in accordance with the stepping force applied onto the brake pedal 3 is output from the master cylinder 2a and supplied to the wheel cylinders 51 through 54. When the brake fluid pressure is thus applied to the wheel cylinders 51 and 52, braking force is exerted to the wheels FR and FL, which are the driven wheels, and, when the brake fluid pressure is applied to the wheel cylinders 53 and 54, the braking force is exerted to the wheels RR and RL, i.e. the rear wheels, which are the driving wheels.

The actuator 30, which forms the fluid pressure controlling device, is set between the master cylinder 2a and the wheels RR and RL and is connected to the pump 40 and the reserver 41. The pump 40 is driven by the internal combustion engine 4, and the brake fluid in the reserver 41 is thereby pressurized to attain an increase of its pressure, the said fluid with the increased pressure being then fed as the power pressurized fluid to the actuator 30. The actuator 30 is provided with a pair of electromagnetic switching valves not shown in the Figure, and these electromagnetic switching valves have the solenoids 31 and 32 shown in FIG. 3 and are driven with the output signals from the electronic control device 10.

Thus, the system makes an adjustment of the brake fluid pressure to such a level as will not result in any locking of the wheels RR and RL by selecting a mode as appropriate out of the available modes, which are the "pressure increase" mode, in which the fluid pressure fed out of the pump 40 is supplied to the wheel cylinders 53 and 54 and the brake fluid pressure is thereby increased, the "pressure decrease" mode, in which the brake fluid pressure is reduced by fluid inter-transfer with the reserver 41, and the "pressure hold" mode, in which the brake fluid pressure is held as it is. Furthermore, the system has still another mode, i.e. the "direct connection" mode, in which the solenoids 31 and 32 are set in their non-excited state and the master cylinder 2a thereby establishes its direct connection with the wheel cylinders 53 and 54.

The proportioning valve 60, which is set between the actuator 30 and the wheel cylinders 53 and 54 mentioned above, has the function of approximating the brake fluid pressure fed to the wheel cylinders 53 and 54 at the side of the rear wheels to the ideal distribution of the braking force by reducing the pressure in a certain ratio to the input fluid pressure. The proportioning valve 60 used in this example of preferred embodiment is one of the so-called load sensing type, which changes its characteristics in accordance with the load borne with the wheels RR and RL.

On the differential gear 7, which is connected to the wheels RR and RL, is arranged a wheel velocity sensor 20, namely, a wheel velocity detecting means. The wheel velocity sensor 20 detects the rotating speed of the propeller shall 6, namely, the average wheel velocity Vw of the rear wheels RR and RL, which are the driving wheels, and outputs electrical signals corresponding to the detected wheel velocity Vw to the electronic control device 10. Also, an acceleration sensor 21 is fixed in an appropriate position to which the vibrations from the road surface and the vibrations of the internal combustion engine 4 are hardly transmitted and detects the acceleration (including deceleration unless specifically excluded) of the motor vehicle, feeding the output of electrical signals to the electronic control device 10.

Also, in order to detect the operation of the brake pedal 3, a brake switch 22 is provided to perform its breaking and making operations in interlocking with the brake pedal 3. This brake switch 22 is turned ON when the brake pedal 3 is operated, the stop lamp not illustrated in the Figure being thereupon turned on, and also the electrical signal indicating that the brake pedal 3 is in its operated state is output to the electronic control device 10. Thus, the output electrical signals from the wheel velocity sensor 20, the acceleration sensor 21, and the brake switch 22 mentioned above are input into the electronic control device 10.

Figure 3:
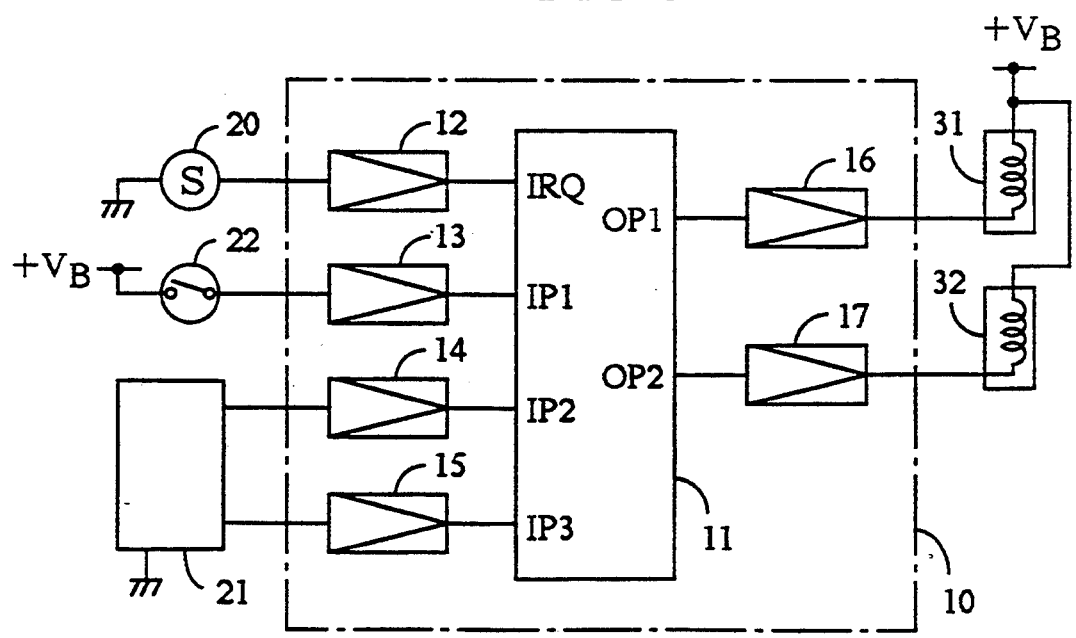
FIG. 3 is a block diagram illustrating the construction of the electronic control system shown in FIG. 2.

The electronic control device 10 is provided with a microprocessor 11, a waveform rectifying circuit 12, an input buffers 13, 14, and 15, and output buffers 16 and 17, as shown in FIG. 3. For the microprocessor 11 in this example of preferred embodiment is used a single-chip microcomputer generally offered for sale on the market, and this microcomputer integrates a free run timer, which outputs the current time, a ROM which stores the program, and a RAM, etc., which are necessary for the execution of the program.

To the waveform rectifying circuit 12, sine wave voltage signals are input from the wheel velocity sensor 20, and the signals are converted into square wave signals in this waveform rectifying circuit 12, the square wave signals being then fed to the interrupt requiring terminal IRQ of the microprocessor 11. Accordingly, interrupt demands are made of the microprocessor 11 at such intervals of time as are in keeping with the wheel velocity detected by the wheel velocity sensor 20.

Also, the on and off states of the brake switch 22 are input to the input port IP1 of the microprocessor 11 via the input buffer 13 in the form of a high level (H) signal for the time when the brake switch 22 is in its on-state and a low level (L) signal when the said brake switch is in its off-state. Moreover, the out put from the acceleration sensor 21 is set at the high (H) level or the low (L) level in accordance with the acceleration of the motor vehicle and is input to the input ports IP2 and IP3 of the micro-processor 11 by way of the input buffers 14 and 15.

In the meanwhile, the output port OP1 of the microprocessor is connected to the solenoid 31 on one of the electromagnetic switching valves in the actuator by way of the output buffer 16. The output port OP2 is connected to the solenoid 32 of the other electromagnetic switching valve by way of the output buffer 17. These output buffers 16 and 17 form the circuits which respectively amplify the electrical signals output from the output ports OP1 and OP2 and respectively excite the solenoids 31 and 32 of the actuator 30.

Thus, in the electronic control device 10 mentioned above, a series of processes for the anti-skid control are performed in accordance with the program executed by the microprocessor 1, and electrical signals are output from the output ports OP1 and OP2. This program has a main routine shown in the flow chart in FIG. 4 and an interrupt routine shown in the flow chart in FIG. 5 and executed when electrical signals are input to the interrupt requiring terminal IRQ.

Figure 4:
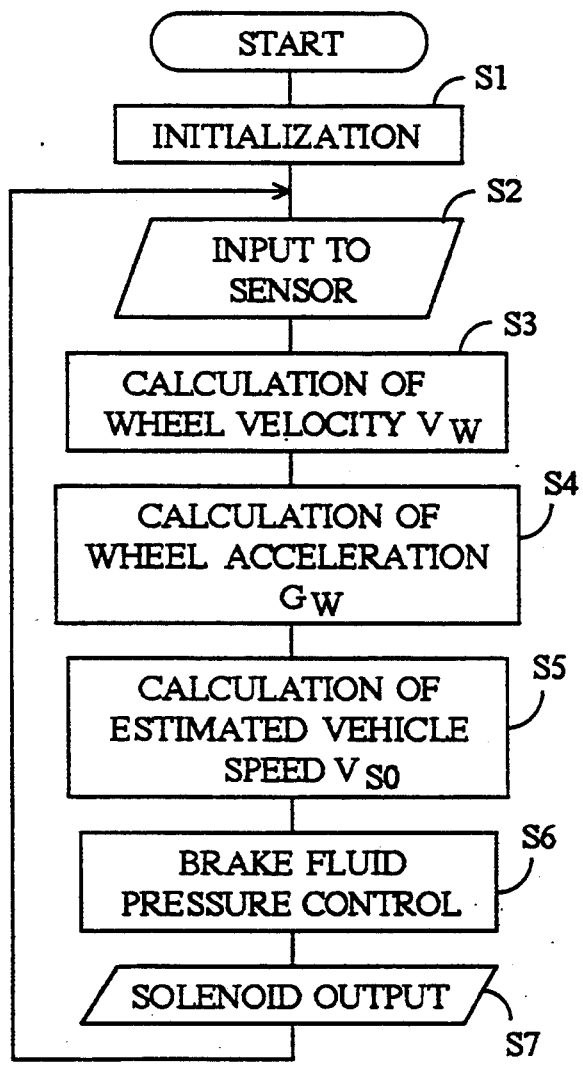
FIG. 4 is a flow chart showing the processing of the main routine for the control of braking force in one preferred embodiment of the present invention.

First, a description is made of the main routine shown in FIG. 4. When power is supplied to tile electronic control device 10, the process of initialization is performed at the step S1. That is to say, the ta, tb, and "control-in-process" flag is cleared to zero. Also, the output from the output ports OP1 and OP2 are set in such a way that the solenoids 31 and 32 are put into their non-excited state.

Next, at the step S2, the signals indicating the state of the brake switch 22 and the signals generated in accordance with the wheel velocity of the motor vehicle as detected by the acceleration sensor 21 are input into the microprocessor 11.

Subsequently, the wheel velocity Vw of the rear wheels is found by arithmetic operations with the following equation (2) on the basis of the period ΔTw of the electrical signal output from the wheel velocity sensor 20. In this regard, the period ΔTw is measured in the operation of the interrupt subroutine described later.

$$Vw = K/\Delta Tw \qquad (2)$$

Wherein, K is a constant set on the basis of the characteristics of the wheel velocity sensor 20.

At the step S4, the wheel acceleration Gw of the rear wheels is found, by arithmetic operations with the equations (3) and (4) cited below, from the wheel velocity Vw as determined by arithmetic operations at the step S3.

$$Int = (\Delta Tw_{(n)} + \Delta Tw_{(N-1)})/2 \qquad (3)$$

$$Gw_{(n)} = (Vw_{(n)} - Vw_{(n-1)})/Int \qquad (4)$$

Wherein, the mark Int indicates the time for the interrupt interval, and $Vw_{(n)}$ and $\Delta Tw_{(n)}$ respectively represent the wheel velocity Vw and the period ΔTw, which have been obtained by the arithmetic operations just described, and $Vw_{(n-1)}$ and $\Delta Tw_{(n-1)}$ respectively represent the wheel velocity Vw and the period ΔTw, which were obtained earlier.

At the step S5, the estimated vehicle speed $Vs_O$ is found from the acceleration Gd of the motor vehicle as detected by the acceleration sensor 21 and the wheel velocity Vw found by the arithmetic operations at the step S3, and additionally the standard speed $Vs_N$ is found by arithmetic operations with the equation (1) given above. In this regard, the estimated vehicle speed $Vs_O$ is worked out in the manner described below with the equation (3) and the equations (5) and (6) given below.

$$Vd_{(n)} = As_O {}_{(n-1)} - L \cdot Gd_{(n)} \cdot Int \qquad (5)$$

$$Vs_{O(n)} = \text{Max}(Vw_{(n)} \cdot Vd_{(n)}) \qquad (6)$$

Wherein, $Vd_{(n)}$ expresses the set speed found at this time and L is a constant determined on the basis of the characteristics of the acceleration sensor 21. Also, $Vs_{O(n)}$ expresses the estimated vehicle speed found at this time while $Vs_{On(n-1)}$ expresses the estimated vehicle speed obtained at the previous time. Max (a, b) is the function which give the larger of a and b.

Next, the operation of the system proceeds to the step S6, at which the system judges how to control the pressure of the brake fluid in the wheel cylinders 53 and 54 on the basis of the wheel velocity Vw, the wheel acceleration Gw, and the estimated vehicle speed $Vs_N$, which are obtained at the steps, S5, S6, and S7. Moreover, the process at the step S6 will be described later. Then, the operation of the system proceeds to the step S7, at which the output signals for driving the solenoids 31 and 32 in accordance with the result of the judgment at the step S6 are output from the output ports OP1 and OP2, and the brake fluid pressure applied to the wheel cylinders 53 and 54 is thereby increased, decreased, or maintained at the same level.

The processes at the steps S1 through S9 are performed repeatedly, and, in case there occurs a considerable slip of the wheels RR and RL on the road surface by the effect of a sharp decline in the wheel velocity Vw, the brake fluid pressure is reduced to promote the rotation of the wheels and RL, and the slip of the wheels RR and RL on the road surface is thereby restrained.

Figure 5:
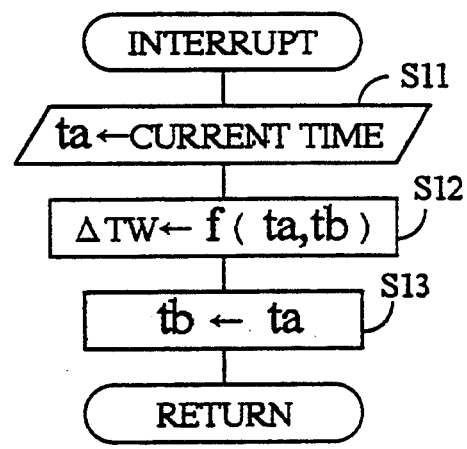
FIG. 5 is a flow chart showing the processing of the interrupt routine in the same preferred embodiment of the present invention.

FIG. 5 shows the interrupt routine mentioned above, and the interval of time between the previous interrupt demand and the current interrupt demand, namely, the period $\Delta Tw$ of the output electrical signal from the wheel velocity sensor 20, is measured. First, the current time ta is set up at the step S11 by the free run timer. Next, at the step S12, the difference of time between the time tb when the previous interrupt demand was made and the current time ta is found by arithmetic operations, and the period $\Delta Tw$ of the output electrical signal from the wheel velocity sensor 20 is thereby set up. Then, the operation proceeds to the step S13, and the time tb is renewed and set up in preparation for the next interrupt demand. After the processes at the step S11 through S13 are performed, the processing of the main routine is performed again.

Figure 6:
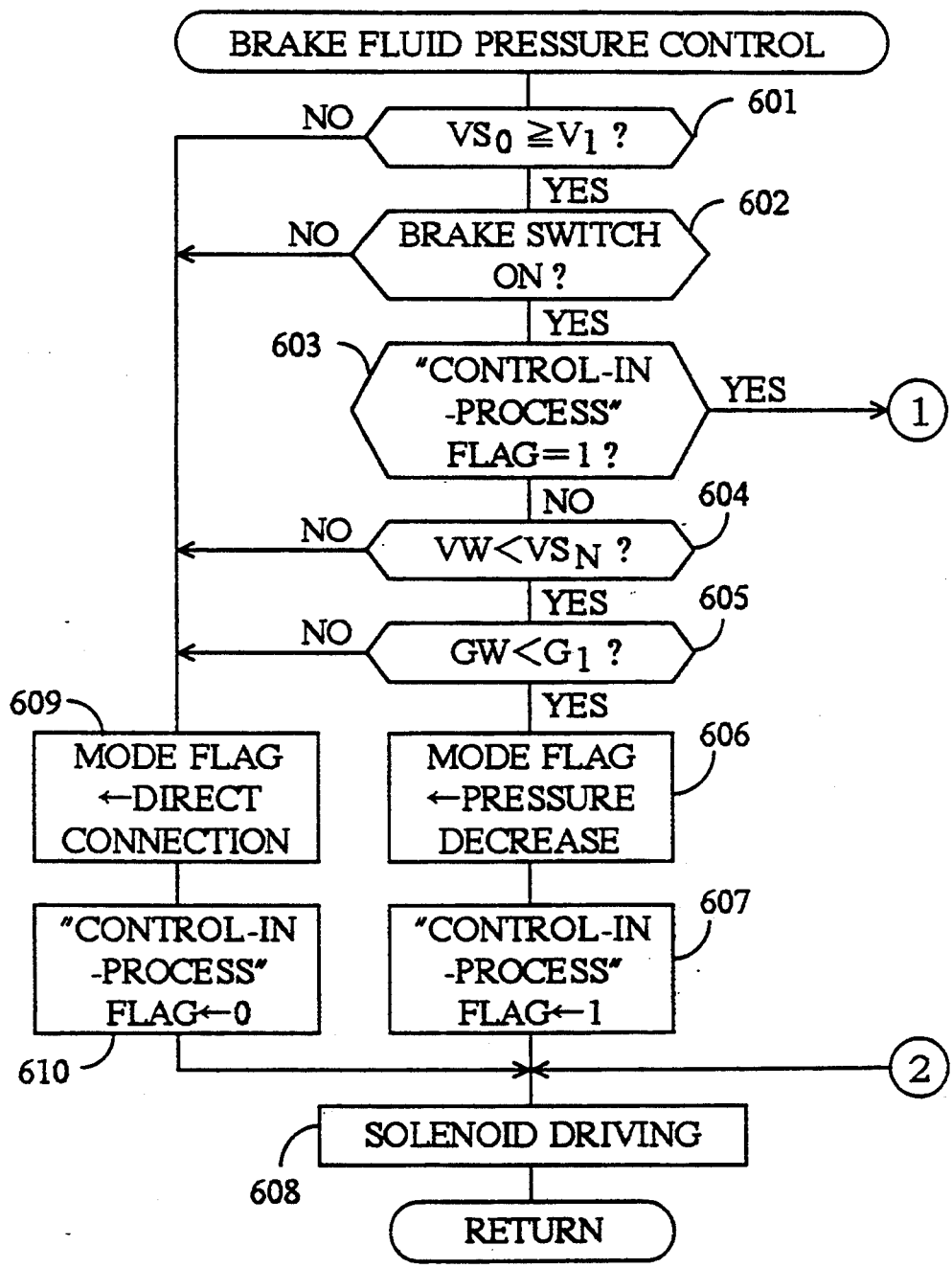
FIG. 6 and FIG. 7 are flow charts showing the processing of the subroutine for the control of brake fluid pressure in the same preferred embodiment of the present invention.
Figure 7:
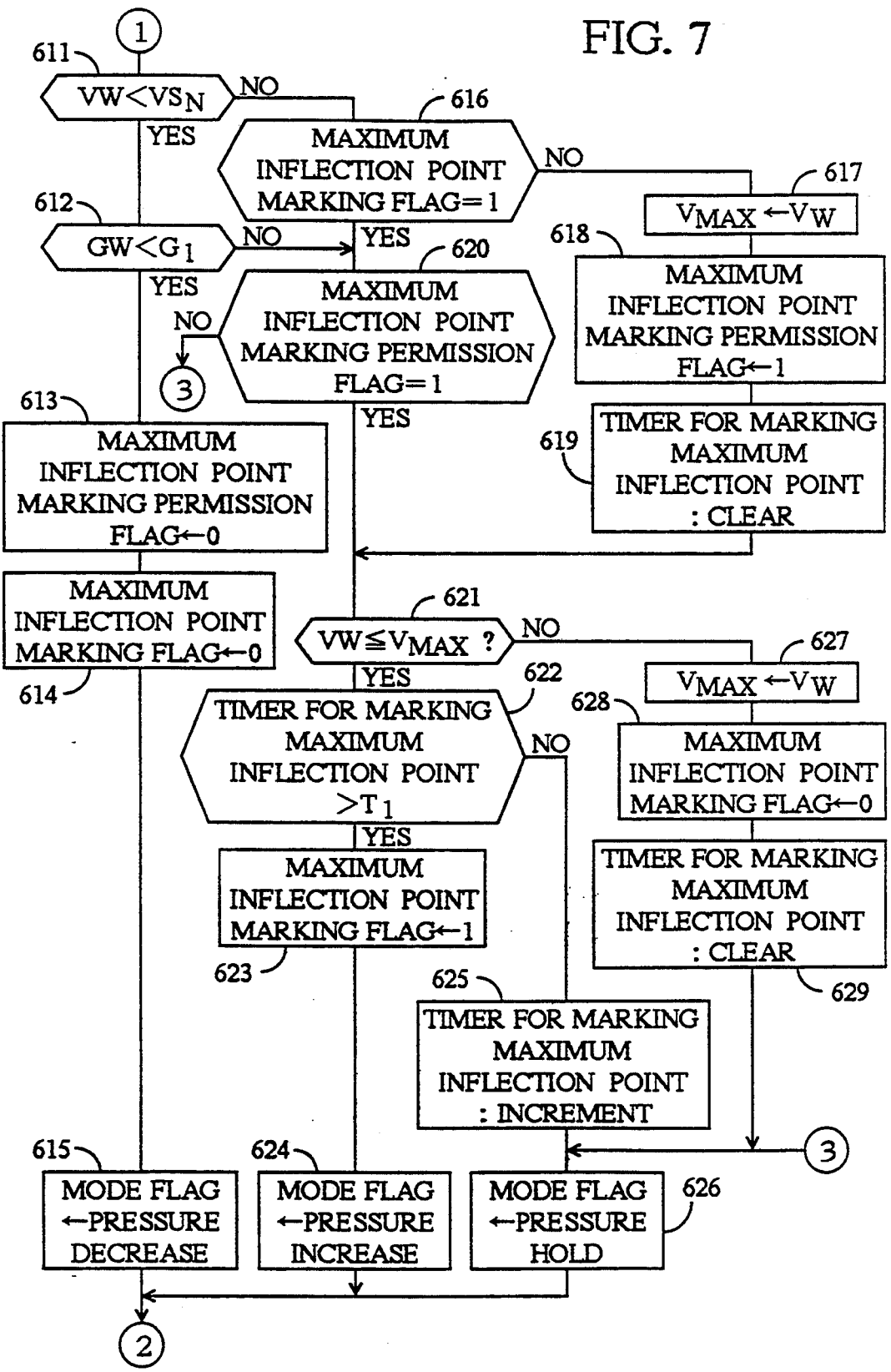
Figure 8:
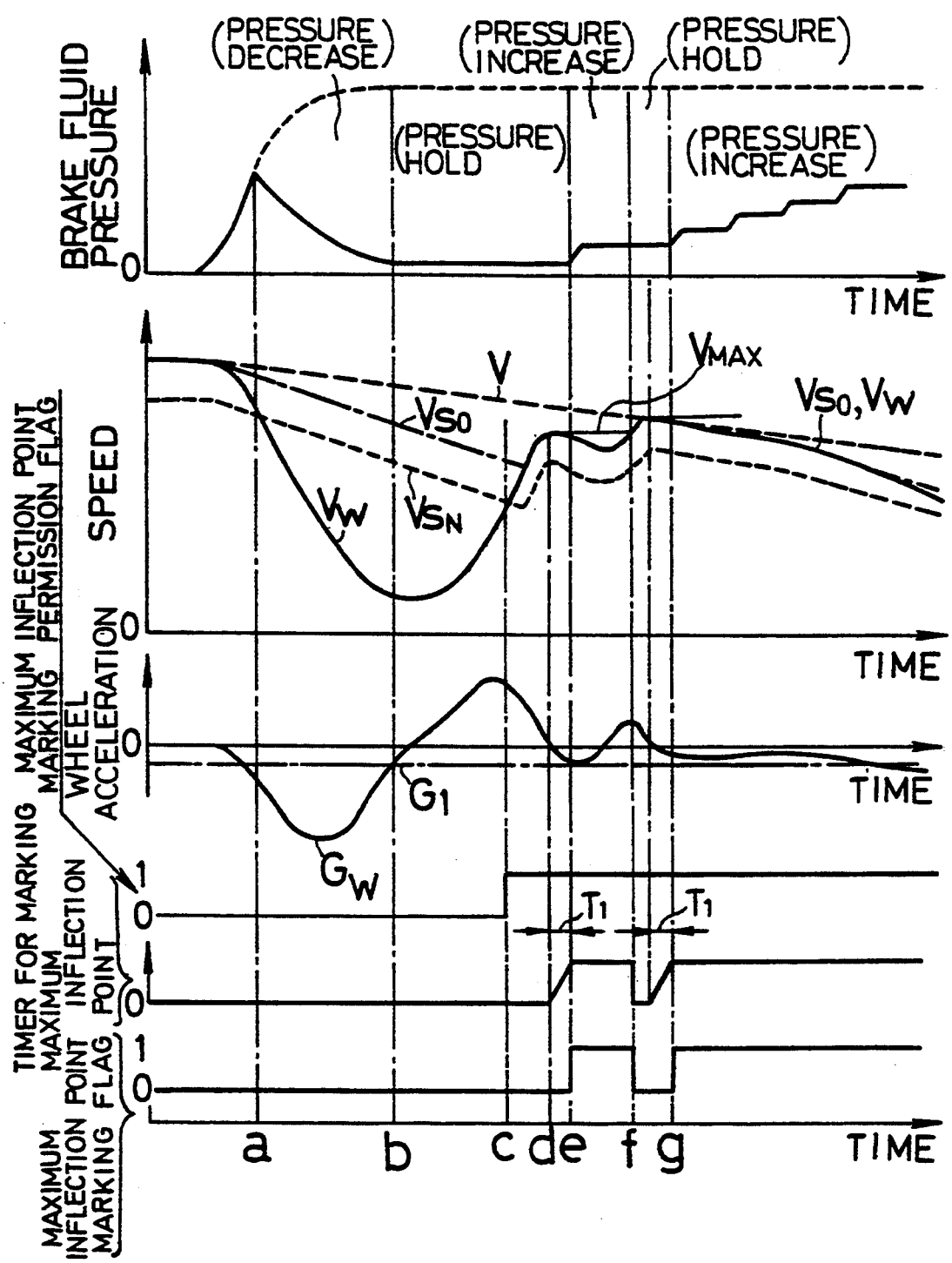
FIG. 8 is a graph illustrating the slate of the control of the brake fluid pressure.
Figure 9:
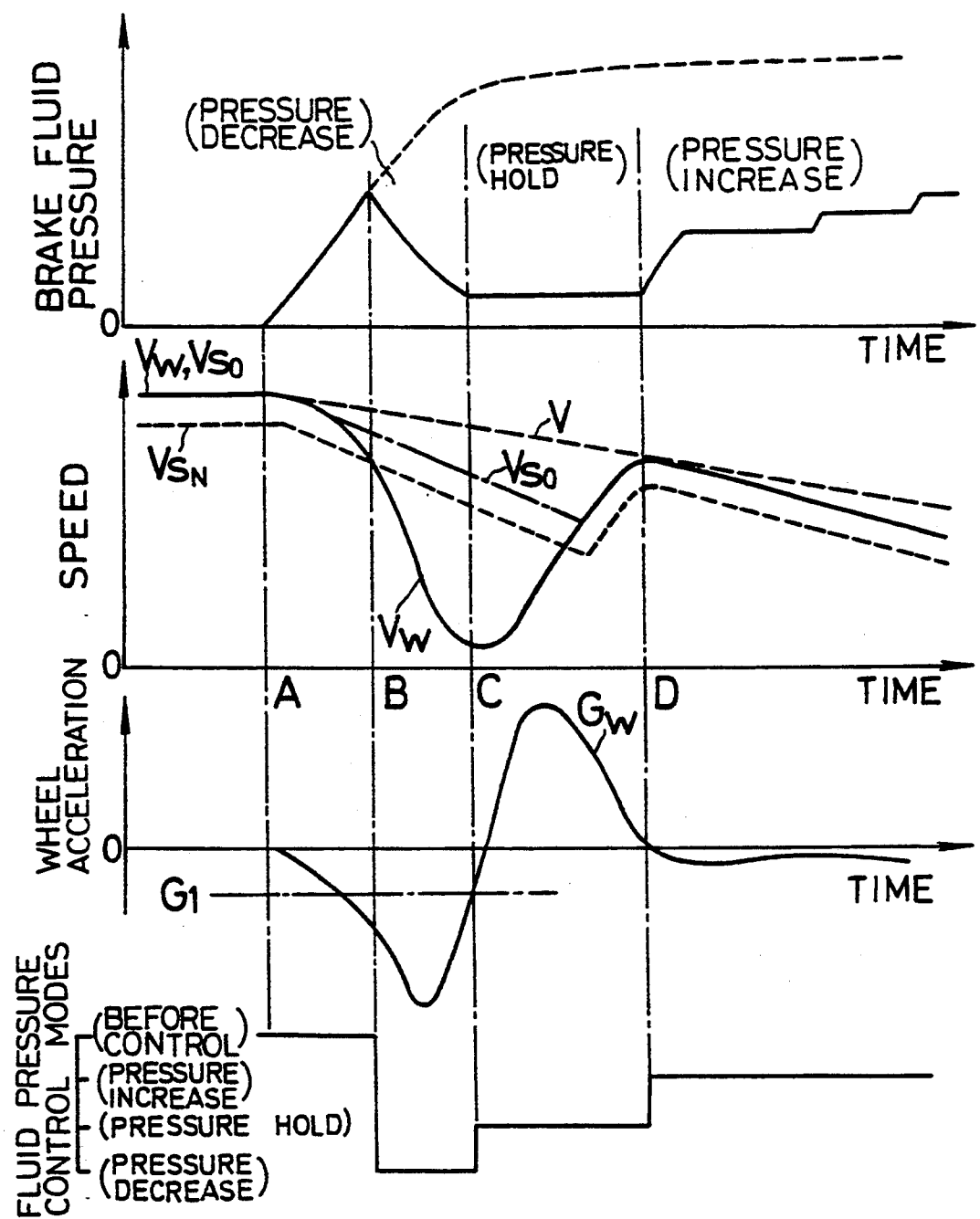
FIG. 9 is a graph illustrating an example of the basic control by the anti-skid control system according to the present invention.

FIG. 6 and FIG. 7 show the subroutine to be executed at the step S6 shown in FIG. 4. This subroutine executes the process of controlling the brake fluid for appropriately selecting the pressure decrease mode, the pressure increase mode, and the pressure hold mode out of the individual fluid pressure controlling modes. Moreover, FIG. 8 shows one example of the state of control performed with the system in this example of preferred embodiment at the time when a brake operation is applied to the motor vehicle. The items in this Figure from the top part downward represent the changes in the pressure of the brake fluid in the wheel cylinders 53 and 54, the changes in the various types of speed, the fluctuations in the wheel acceleration, and the state of the setting of the maximum inflection point marking permission flag, which is described later, the state of the operation of the maximum inflection point marking timer, and the state of the setting of the maximum inflection point marking flag. In the following part,, the subroutine for the control of the brake fluid pressure shown in FIG. 6 and FIG. 7 is described with reference to FIG. 8.

First, at the step 601, the system judges whether or not the condition for the start of the brake fluid pressure control is fulfilled. That is to say, the estimated vehicle speed $Vs_O$ is compared with the prescribed stop marking speed $V_1$, which is set., for example, at 5 km/h. In case it is found that the motor vehicle is at the stop marking speed, the system proceeds to the step 609, and no control is performed over the pressure of the brake fluid. Moreover, the on or off state of the brake switch 22i is,judged at the step 602, and, if it is ON, the system proceeds to the step 603. In case the said state is OFF, the system proceeds to the step 609, and this brake fluid pressure control is not performed.

At the step 603, the system,judges whether or not the "control-in-process" flag is set. This "control-in-process" flag is the flag which is set at the step 607 described later when the system starts the control of the brake fluid pressure, arid this flag is kept in its set state while the control of the brake fluid pressure is being performed. For example, the "control-in-process" flag is set at the point a in FIG. 8. In case the "control-in-process" flag remains set, the system proceeds to the step 611 shown in FIG. 7, but it proceeds to the step 604 in case the said flag is not set.

At the step 804, it is, judged whether or not the rear wheels RR and RL, which are the driving wheels, are slipping. Specifically, it is judged at the step 604 whether or not the wheel velocity Vw of the rear wheels is any smaller than the standard speed $Vs_N$ (i e. $Vw < Vs_N$). In case it is found that the wheel velocity Vw is any lower than;the standard speed $Vs_N$ (i.e. $Vw < Vs_N$), it is judged that a slip has occurred to the wheels RR and RL, and the system proceeds to the step 605. In contrast to this, when the wheel velocity Vw is equal to or in excess of the standard speed $Vs_N$ (i.e. $Vw \geq Vs_N$), it is judged that the wheels RR and RL are not slipping. In this case, the system proceeds to the step 609 and does not perform any brake fluid pressure control.

At the step 805, it is judged whether or not the wheel acceleration Gw of the rear Wheels is any smaller than the prescribed acceleration $G_1$. In case the wheel acceleration Gw of the rear wheels is found to be any smaller than the prescribed acceleration $G_1$ (i.e. $Gw < G_1$), it is judged that the rear wheels RR and RL are, just about to lock. In such a case, the step 806 is executed, and the brake fluid pressure control is started. In contrast to this, when the wheel acceleration Gw of the rear wheels is equal to or any larger than the prescribed acceleration (i.e. $Gw \geq G_1$), it is judged that the rear wheels RR and RL will not lock immediately, and the system proceeds to the steep 609, not performing any brake fluid pressure control.

If the step 606 mentioned above is performed, the electronic control device 11 starts the brake fluid pressure control. At the step 606, tithe mode flag is set in the pressure decrease mode, and, after the "control-in-process" flag is set at the step 607, the state of excitation and the state of non-excitation are set in the solenoids 31 and 32 in such a manner that the pressure of the brake fluid in the wheel cylinders 53 and 54 is reduced at the step 608. Moreover, the "control-in-process" flag is kept in its set state until the estimated vehicle speed $Vs_O$ declines to a level lower than the stop marking speed $V_1$ (at the step 601 ), or until the brake switch 22 is turned OFF (at the step 602 ).

At the step 608, the state of excitation and the state of non-excitation are set sin the solenoids 31 and 32, depending on the mode flag, which indicates either one of the "pressure decrease" mode, the "pressure increase" mode, the "pressure hold" mode, and the "direct connection" mode. Then, at the step S7 shown in FIG. 4, a driving signal is output. When "pressure decrease" is indicated on the mode flag, the brake fluid pressure is reduced with an interconnection established between the wheel cylinders 253 and 54 and the reserver 41 by the action of the actuator 30. Moreover, when "pressure increase" is indicated on the mode flag, the fluid pressure output from the pump 40 is fed in a step-by-step increase to the wheel cylinders 53 and 524 by the action of the actuator 30 in what may be called a step-by-step increase. Furthermore, when "pressure hold" is indicated on the mode flag, the brake fluid pressure in the wheel cylinders 53 and 54 is maintained by the action of the actuator 30. Additionally, when "direct connection" is indicated on the mode flag, the wheel cylinders 53 and 54 and the master cylinder 2a are directly connected by way of the actuator 30.

On the other hand if the "control-in-process" flag is set at the step 603, the system proceeds to the step 611 shown in FIG. 7, at which it is judged whether or not the rear wheels RR and RL are slipping. Now, since the process at this step 611 is the same as that at the step 604 mentioned above, a description of the process is omitted. In case it is judged that the wheels RR and RL are slipping, the system proceeds to the step 612. In case it is found that the wheels RR and RL are not slipping, the system proceeds to the step 616.

At the step 612, it is judged whether or not the wheel acceleration Gw of the rear wheels is any smaller than the prescribed acceleration $G_1$. Since the process at the step 612 is the same as that at the step 605, a description of the process is omitted here. In case the wheel acceleration Gw is any smaller than the prescribed acceleration $G_1$, the maximum inflection point marking permission flag and the maximum inflection point marking flag are reset at the step 613 and the step 614, respectively. In this regard, the maximum inflection point marking permission flag is the flag which indicates that there is a condition in which the routine for the processing of the maximum inflection point at the step 621 can be executed. The maximum inflection point marking flag, moreover, is the flag which indicates that the system is in the process of marking the maximum inflection point. In this regard, the system proceeds to the step 620 when it is found at the step 612 that the wheel acceleration Gw is equal to or in excess of the prescribed acceleration $G_1$.

After the processing performed at the steps 613 and 614, the mode flag is set at "pressure decrease" at the step 615, and the system proceeds to the step 608 shown in FIG. 4 and performs the operation for a reduction of the pressure of the brake fluid in the wheel cylinders 53 and 54. For example, the section from the point a to the point b in FIG. 8 is the pressure decrease mode.

If the maximum inflection point marking flag is not set at the step 616, the system proceeds to the step 617, at which the system sets the wheel velocity at that point in time as the maximum wheel velocity $V_{Max}$. In this case, the wheel velocity Vw is equal to or higher than the standard speed $Vs_N$ (the step 611), the maximum inflection point marking permission flag is set at the step 618 and also the timer for the marking of the maximum 618 inflection point is cleared at the step 619. Then, the system proceeds to the step 621 and the subsequent steps. That is to say, the state of the operation of the system will be as shown at the point C in FIG. 8. If the maximum inflection point marking flag is set at the step 616, the maximum inflection point is being marked. Therefore, the system does nothing but to proceed to the step 620 and the subsequent steps.

Figure 10:
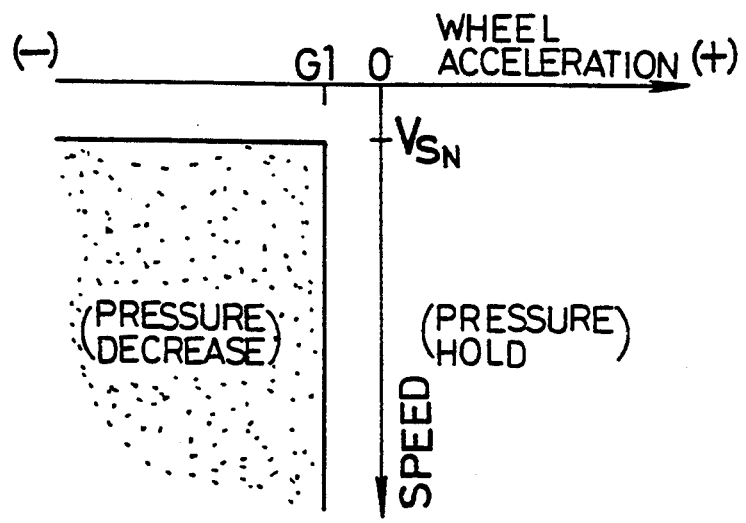
FIG. 10 is a graph illustrating the conditions for the start of the pressure decreasing operation.
Figure 11:
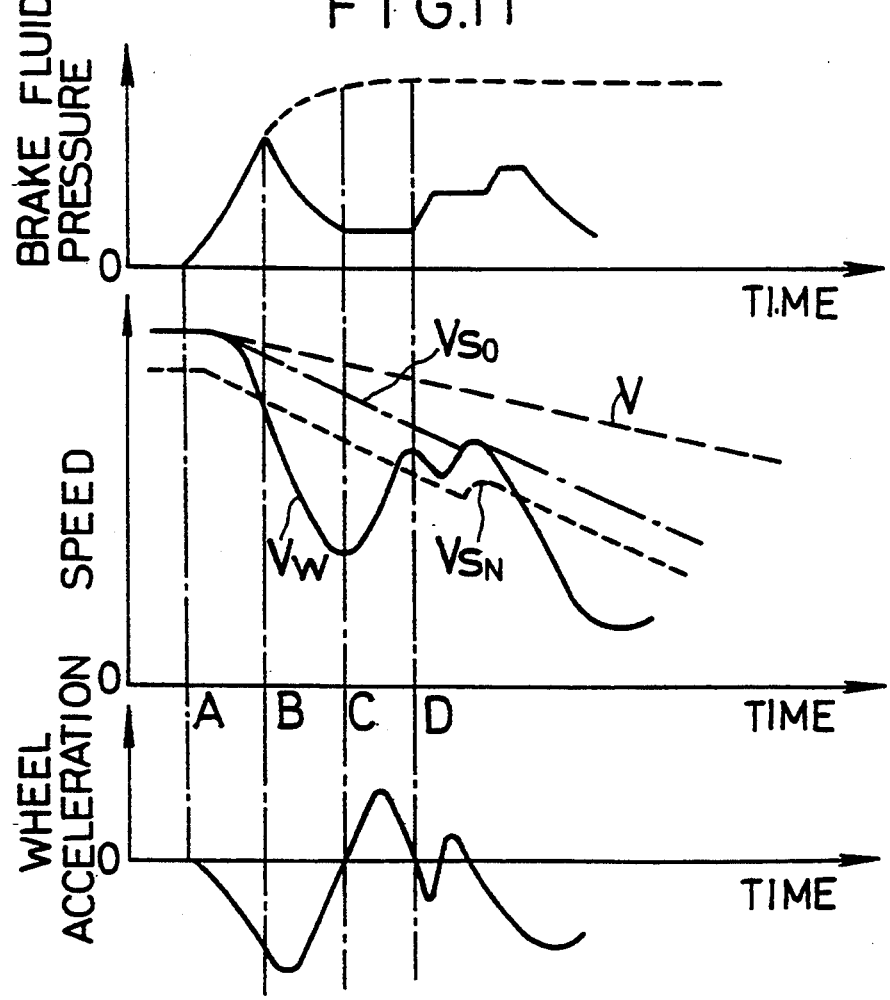
FIG. 11 is a graph showing the state of the control in a case in which the existing anti-skid control system is applied to the example of the basic control shown in FIG. 9.

On the other hand, in case it is judged at the step 612 that the wheel acceleration Gw is either equal to or higher than the acceleration speed $G_1$, namely, in case the fluid pressure controlling mode is set at "pressure hold" as shown in FIG. 10, then it is judged at the step 620 whether or not the maximum inflection point marking permission flag is set. If the flag is not set, the system sets the brake fluid pressure controlling mode in, the "pressure hold" mode at the step 626. If the maximum inflection point marking permission flag is set, the system proceeds to the step 621.

At the step 621, the system judges whether or not the wheel velocity Vw has exceeded the maximum wheel velocity $V_{MAX}$ after the state of the maximum inflection point marking permission is attained while the wheel velocity Vw is not any lower than the standard speed $Vs_N$. If the wheel velocity Vw is equal to or lower than the maximum wheel velocity $V_{MAX}$ as shown at the point d in FIG. 8, namely, not in any excess of the maximum value of the wheel velocity Vw up to that point in time, the system proceeds to the step 622, at which the system marks the maximum inflection point.

At the step 622, it is judged whether or not the timer for marking the maximum inflection point has counted any value larger than the prescribed duration of time $T_1$. By this operation, it is judged that the maximum inflection point has not been attained, if the state in which the wheel velocity Vw is either equal to or lower than the maximum wheel velocity $V_{MAX}$ has not continued for the prescribed duration of time $T_1$, for example, 40 mS. If the said state has continued for the prescribed duration of time $T_1$, then it is found that the wheel velocity Vw has continued to remain below the value of the maximum wheel velocity $V_{MAX}$ for the said duration of time and that the maximum wheel velocity $V_{MAX}$ immediately prior to The decline of the wheel velocity Vw marks the wheel velocity at the maximum inflection point. Then, the system proceeds to the step 623, at which the maximum inflection point marking flag is set up. Thereafter, the fluid pressure control is set in the pressure increase mode at the step 624. That is to say, the state of control assumes the condition shown as from the point e in FIG. 8.

In case the timer for marking the maximum inflection point does not count the prescribed duration of time $T_1$ at the step 622, the timer for marking the maximum inflection point is incremented at the step 625, after which the state of the fluid pressure control is set in the pressure hold mode at the step 626.

On the other hand, it is judged at the step 621 that the wheel velocity Vw has exceeded the maximum wheel velocity $V_{MAX}$, the value of the wheel velocity Vw at the particular moment is first set as the value of the maximum wheel velocity $V_{MAX}$ at the step 627. In other words, the value of the maximum wheel velocity $V_{MAX}$ is renewed in regular sequence while the wheel velocity Vw is in the process of its recovery. Then, after the maximum inflection:point marking flag is reset at the step 628, with the timer for marking the maximum inflection point being then cleared at the step 629, the system proceeds to the step 626, at which the fluid pressure control is set in the pressure hold mode. That is to say, the brake fluid pressure control will be in the state shown at the point f in FIG. 8.

The maximum inflection point marking flag is thus reset at the step 628. Therefore, when the maximum inflection point is formed again with the wheel velocity Vw increasing to a level equal to or in excess of the standard velocity $Vs_N$, the system proceeds from the step 616 to the step 617, at which the wheel velocity at the particular moment is set as the maximum wheel velocity $V_{MAX}$, and, after the operations at the steps 618 and 619, the marking operation is performed at the step 621. Then, at the step 623, the maximum inflection point marking flag is set, and the state of the brake fluid pressure control will be as shown at the point g in FIG. 8. With the brake fluid pressure control being thus brought to a finish, the mode flag is set at "direct connection" at the step 609 shown in FIG. 6, and the "control-in-process" flag is thereupon reset at the step 610.

By the repeated execution of the steps 611 through 626 mentioned above, the wheels RR and RL are prevented from their locking at an early stage, and stable braking force is thereby secured. At the step 626, moreover, the brake fluid pressure control is kept in the pressure hold mode, it is also feasible to set the pressure control in the pressure decrease mode. [Advantageous Effect of the Invention]

As the present invention is constructed as described above, it achieves the following advantageous effects.

Specifically, the anti-skid control system according to the present invention shifts from the pressure increase mode to either the pressure hold mode or the pressure decrease mode in case the maximum inflection point is detected at a wheel velocity not any lower than the standard speed and then the motor vehicle has attained any wheel velocity equal to or higher than that recorded at the particular moment when the maximum inflection point is thus detected, and this system can therefore prevent the wheels from their locking at an early stage. Above all, this system is capable of securing a stable braking effect without causing any error in the identification of the maximum inflection point even in case a deceleration occurs on a rough road surface where fluctuations occur in the wheel velocity.

What is claimed is:

1. An anti-skid control system which is provided with wheel cylinders furnishing braking force to the individual wheels on a motor vehicle, comprises a fluid pressure generating device, which supplies brake fluid pressure to said wheel cylinders, a fluid pressure controlling device set in the fluid pressure channels connected to form intercommunicating links between said fluid pressure generating means and said wheel cylinders and controlling the brake fluid pressure, a wheel velocity detecting means, which detects the rotating speed of said wheels and outputs signals in accordance with the wheel velocity, a standard speed setting means, which finds the standard speed by arithmetic operations on the basis of the wheel velocity detected by said wheel velocity detecting means, and a fluid pressure controlling mode setting means, which drives said fluid pressure controlling device by setting one of the fluid pressure controlling modes, which are the pressure decrease mode for decreasing said brake fluid pressure, the pressure hold mode for maintaining said pressure, and the pressure increase mode for increasing said pressure, wherein said anti-skid control system is provided with a fluid pressure controlling mode setting means, which sets either one of the pressure decrease mode and the pressure hold mode in case said wheel velocity declines to a level lower than said standard speed and sets the pressure increase mode in case said wheel velocity is equal to or higher than said standard speed, a maximum inflection point detecting means connected to the standard speed setting means for detecting the maximum inflection point indicating a maximum value of the wheel velocity in case at least said wheel velocity is not any lower than said standard speed wherein the wheel velocity which is increasing is turned into the decreasing condition at the maximum inflection point, and a fluid pressure controlling mode correcting means, which switches from the pressure increase mode to one of said pressure hold mode and said pressure decrease mode in case said wheel velocity becomes equal to or higher than said standard speed and also becomes again equal to or higher than the wheel velocity at said maximum inflection point after said maximum inflection point detecting means detects the maximum inflection point.

* * * * *